United States Patent [19]

Cheng

[11] Patent Number: 5,458,448
[45] Date of Patent: Oct. 17, 1995

[54] EXPANSION BOLT STRUCTURE

[76] Inventor: Yu-Hsin Cheng, No. 22, Lane 210, Tan-Hai Road, Tan-Shui, Taipei Hsien, Taiwan

[21] Appl. No.: 246,728

[22] Filed: May 20, 1994

[51] Int. Cl.[6] .............................. F16B 13/04; F16B 13/06
[52] U.S. Cl. .................... 411/55; 411/33; 411/60
[58] Field of Search ................... 411/32, 33, 55, 411/57, 60, 61, 51

[56] References Cited

U.S. PATENT DOCUMENTS

| | | | |
|---|---|---|---|
| 665,705 | 1/1901 | Summerer | 411/33 |
| 2,516,554 | 7/1950 | Coyne | 411/51 |
| 3,709,088 | 1/1973 | Pitzer | 411/60 |
| 4,714,391 | 12/1987 | Bergner | 411/55 |

FOREIGN PATENT DOCUMENTS

| | | | |
|---|---|---|---|
| 999794 | 10/1951 | France | 411/55 |
| 2643154 | 4/1977 | Germany | 411/33 |
| 2754910 | 6/1979 | Germany | 411/32 |
| 275721 | 1/1990 | Germany | 411/33 |
| 91090 | 12/1937 | Sweden | 411/33 |

*Primary Examiner*—Neill R. Wilson
*Attorney, Agent, or Firm*—Poms, Smith, Lande & Rose

[57] ABSTRACT

An expansion bolt includes an elongated bolt body having a threaded section formed on one end and an expanded shoulder portion formed on an opposite end. An expansion cylinder slidably fits over the bolt body has a flat end supported by the shoulder and slits formed on the opposite end. An expanding ring has an inclined outer surface with the small end insertable into the slitted end of the expansion cylinder is slidably fit over the bolt body to have the small end thereof facing the slitted end of the expansion cylinder. A collar nut retains the expansion cylinder and the expanding ring on the bolt body with a support cylinder disposed between the collar nut and the expanding ring so that when the nut is tightened, the support cylinder forces the expanding ring toward the expansion cylinder to have the small end of the expanding ring wedge into and thus flaringly expand the slitted end of the expansion cylinder. The flaring tips of the slitted end are forced to be in tight contact engagement with a hole. The flaring tips also serve as ratchet members which partially penetrate into the side wall of the hole to prevent the expansion bolt from being withdrawn out of the hole.

11 Claims, 4 Drawing Sheets

EXPANSION BOLT STRUCTURE

FIELD OF THE INVENTION

The present invention relates generally to an expansion bolt which has an expansion cylinder having slitted tips outward expandable to grippingly secure the expansion bolt within a mounting hole formed in a wall when a nut member is screwed on the bolt.

BACKGROUND OF THE INVENTION

An expansion bolt is a fastener which is capable to grippingly secure itself in a hole formed on a wall or cement ground in advance with a threaded portion extending out of the hole to secure or engage other article by means of threading or nut. To be secured within the hole, the expansion bolt usually comprises a tubular member or hollow cylinder loosely and slidably fit over the bolt body. The tubular member has axially-extending slits formed on one end thereof and, corresponding to the slitted end of the tubular member, the bolt has an un-threaded end which is expanded and flared outward so as to be larger than the tubular member in diameter to provide an inclined camming surface which stops the sliding of the tubular member relative to the bolt body toward the expanded end of the bolt and serves to expand the slitted end of the tubular member when the tubular member is forced to slide over the expanded end of the bolt, which expansion of the slitted end of the tubular member allows the slitted portions of the tubular member to be in tight contact engagement with the inner side wall of the mounting hole so as to grippingly hold the bolt within the hole by friction therebetween.

An example of conventional expansion bolts is shown in FIGS. 1 and 2 of the accompanying drawings. The conventional expansion bolt, generally designated with the reference numeral 10, comprises an elongated bolt body 12 which has a threaded section 14 formed one end thereof and an un-threaded section 16 formed on an opposite end. The un-threaded section 16 comprises an expanded and flared end 18 which has an inclined circumferential camming surface 19. An expansion cylinder or tubular member 20 which has an inside diameter slightly larger than the bolt body 12 but smaller than the expanded end 18 is slidably and loosely fit over the bolt body 12 and may be secured thereon by a collar nut 22 to have an end 24 which has a plurality of axial slits 25 formed thereon abut against the inclined camming surface 19.

As shown in FIG. 2, to use the expansion bolt 10, a mounting hole 26 having an inside diameter slightly larger than the overall outside diameter of the expansion bolt 10 is formed by any known means, such as drilling, in advance in a wall or a solid fixture 28. By inserting the expansion bolt 10 into the hole 26 in such a manner to have the expanded end 18 located within the hole 26 and the threaded section 14 at least partially extending out of the hole 26, and by screwing the nut 22 inward to force the slitted end 24 of the expansion cylinder 20 to slide over the expanded end 18 of the bolt body 12, the slitted end 24 is expanded and flares outward by the camming action of the inclined camming surface 19 of the expanded end 18 so as to have the tips thereof forcibly engage the inside diameter of the mounting hole 26 to grippingly hold the expansion bolt 10 inside the hole 26. Articles or mechanical parts (not shown) to be secured to the wall or the fixture 28 can then be tightened on the threaded section 14 of the expansion bolt 10 which extends out of the mounting hole 26 and the expansion cylinder 20 by means of nut or threading.

Expansion bolt of this kind works well in securing articles to a fixture or supporting a great load on a wall. However, as can be seen in FIG. 2, if a great axial drawing force is applied to the expansion bolt 10, it is possible for the expansion bolt 10 to be forcibly withdrawn out of the hole 26 due to the fact that the inclining direction of the expanded end 18 of the bolt body 12 and thus the slitted end 24 of the expansion cylinder 20 which is expanded by the expanded end 18 of the bolt body 12 is in favor of the withdrawal.

It is therefore desirable to provide an expansion bolt structure which has an expansion cylinder to be expanded in such a manner to have the inclination of the slitted end oriented against withdrawal of the expansion bolt out of the hole in which it is secured.

SUMMARY OF THE INVENTION

The principal object of the present invention is to provide an improved expansion bolt structure which has an expansion cylinder with a slitted end to be expanded by sliding over an inclined surface when an associated nut member is tightened on the bolt in such a manner that the expanded slitted end of the expansion cylinder not only tightly contacts and thus frictionally holds the expansion bolt inside a mounting hole, but also serves as a ratchet member which partially penetrates into the side wall of the mounting hole when acted upon by a withdrawal force in such a direction to stop the expansion bolt from moving out of the mounting hole.

In accordance with the present invention, there is provided an improved expansion bolt which comprises an elongated bolt body having a threaded section formed on one end thereof and an expanded portion formed on an opposite end to define a shoulder. An expansion cylinder which is slidably fit over the bolt body has a flat end supported by the shoulder and slits formed on the opposite end. An expanding ring which has an inclined outer surface with the small end insertable into the slitted end of the expansion cylinder is slidably fit over the bolt body to have the small end thereof facing the slitted end of the expansion cylinder. A collar nut is provided to retain the expansion cylinder and the expanding ring on the bolt body with a support cylinder, also slidable along the bolt body, disposed between the collar nut and the expanding ring so that when the nut is tightened, the support cylinder forces the expanding ring toward the expansion cylinder to have the small end of the expanding ring wedge into and thus flaringly expand the slitted end of the expansion cylinder. By the expansion of the slitted end, the flaring tips of the slitted end are forced to be in tight contact engagement with the inside diameter of a hole in which the expansion bolt is inserted to secure therein. The flaring tips also serve as ratchet members which partially penetrate into the side wall of the hole to prevent the expansion from being withdrawn out of the hole when a withdrawal force is applied on the expansion bolt.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENTS

Figure 3:
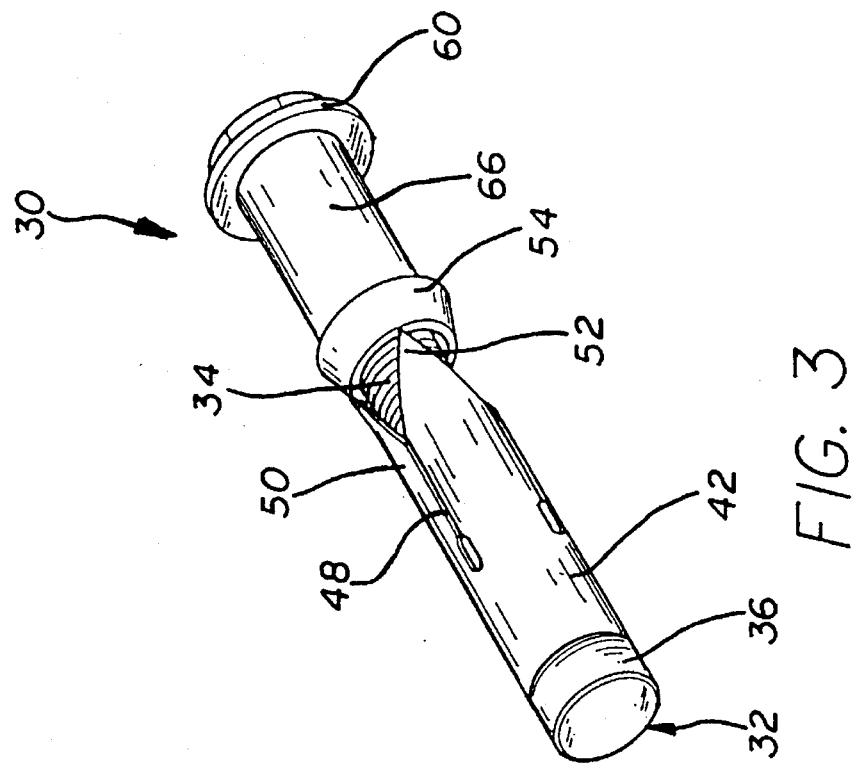
FIG. 3 is a perspective view showing an expansion bolt constructed in accordance with a first embodiment of the present invention.
Figure 1:
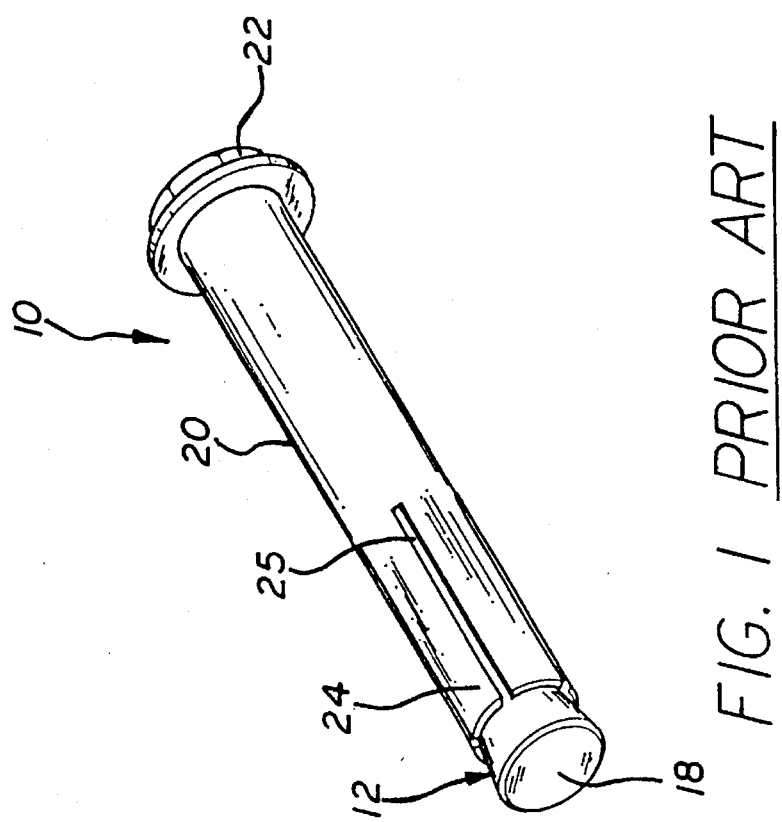
FIG. 1 is a perspective view showing a prior art expansion bolt.
Figure 2:
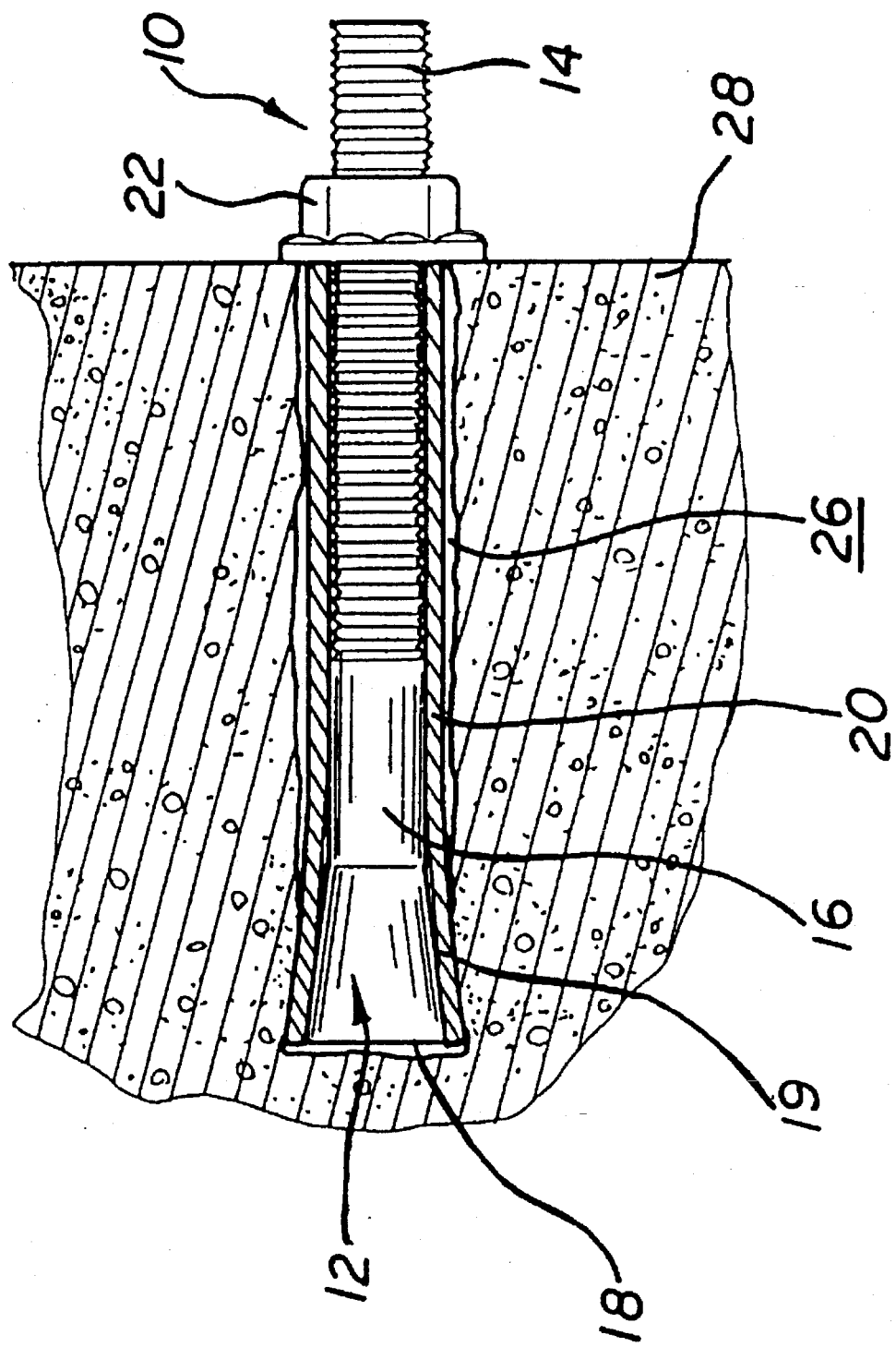
FIG. 2 is a cross-sectional view showing the prior art expansion bolt anchored in a mounting hole formed on a wall.
Figure 4:
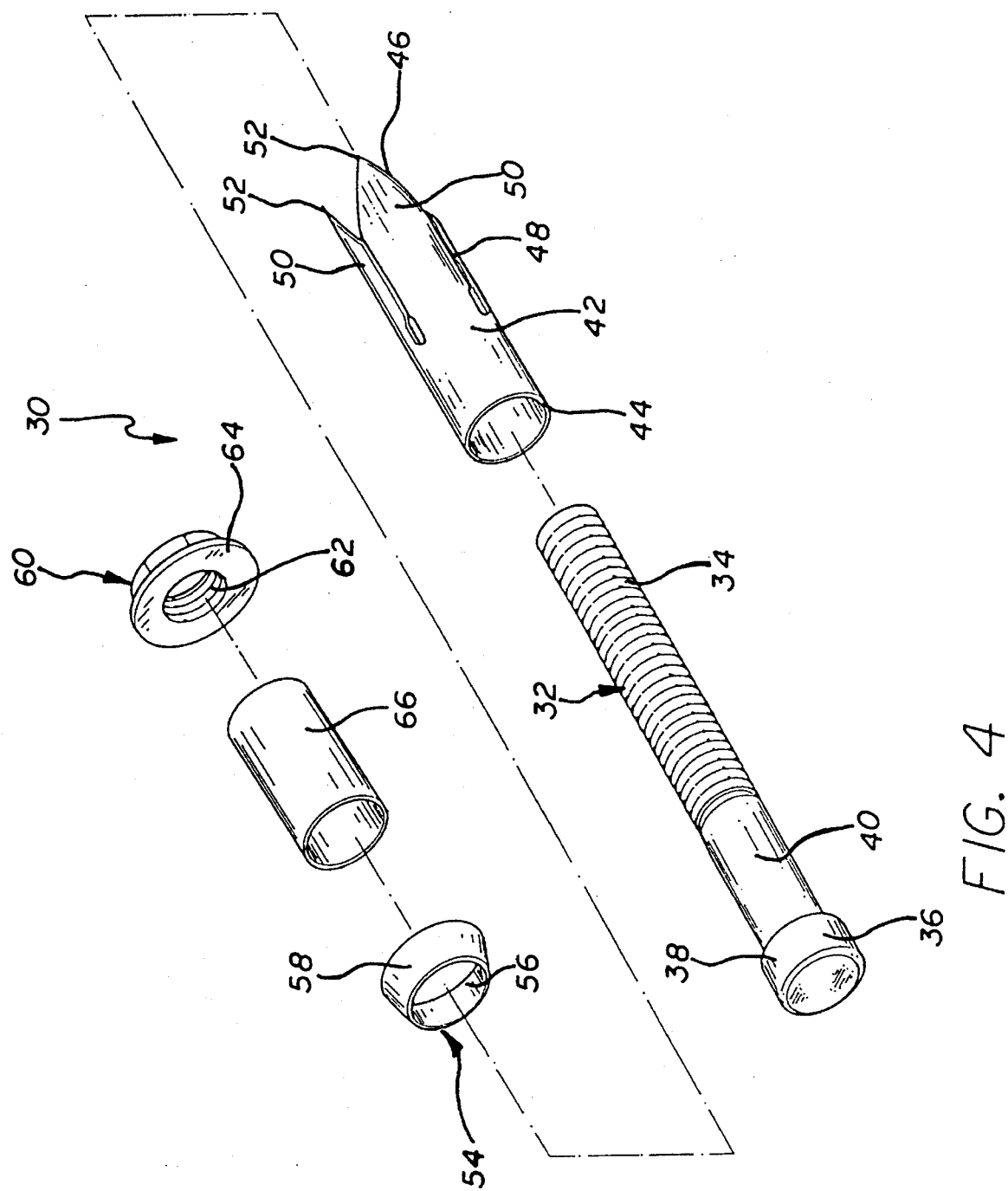
FIG. 4 is an exploded perspective view showing the expansion bolt of the first embodiment of the present invention.

With reference to the drawings and in particular FIGS. 3 and 4, wherein an expansion bolt constructed in accordance with an embodiment of the present invention, generally designated with the reference numeral 30, is shown, the expansion bolt 30 comprises an elongated bolt body 32 having a threaded section 34 formed on a first end thereof and an expanded end portion 36 formed on a second, opposite end. The expanded end 36 defines a circumferential shoulder 38 with the elongated bolt body 32. Preferably an un-threaded section 40 is provided between the threaded end 34 and the expanded end 36 of the elongated bolt body 32.

An expansion cylinder 42 having such an inside diameter to allow it to be slidably fit over the bolt body 32. The expansion cylinder 42 has a first end 44 having a flat end edge and an opposite, second end 46 having a plurality of slits 48 extending substantially parallel with a central axis of the expansion cylinder 42 to define a number of tabs 50 which are separated by the slits 48. Preferably, each of the tabs 50 has a sharpened end 52 which, as will be described in more detail hereinafter, serves as a ratchet member when expanded to form a flared condition. The first end 44 of the expansion cylinder 42 is stopped and supported by the shoulder 38 defined by the expanded end 36 of the bolt body 32 when the expansion cylinder 42 is fit over the bolt body 32.

The expansion cylinder 42 has a length substantially shorter than the bolt body 32 so that when the expansion cylinder 42 is fit over the bolt body 32, a portion of the threaded section 34 is exposed to allow an expanding ring 54 to slidably fit thereon. The expanding ring 54 comprises a central hole 56 to slidably receive therein the bolt body 32 and an inclined outer surface 58 which is reduced toward the slitted end 46 of the expansion cylinder 42 with an endmost outside diameter smaller than and insertable into the inside diameter of the expansion cylinder 42 so that when the expanding ring 54 is forced to wedge into the slitted end 46 of the expansion cylinder 42, the inclined outer surface 58, acting as a wedge, expands the slitted end 46 of the expansion cylinder 42 outward to a flaring condition.

To move the expanding ring 58 toward and into the slitted end 46 of the expansion cylinder 42, a nut member, preferably a collar nut 60, having an inner thread 62 threadingly engages the threaded section 34 of the bolt body 32 with the collar 64 abutting against the expanding ring 54 via a support cylinder 66.

The support cylinder 66 has an inside diameter large enough to allow the support cylinder 66 to be slidably fit over the bolt body 32 and having one end thereof in contact engagement with the expanding ring 54 and an opposite end abutted by the collar 64 of the nut member 60 so that when the nut member 60 is tightened on the threaded section 34 of the bolt body 32, the collar 64 of the nut member 62 pushes the support cylinder 66 to move the expanding ring 54 toward and into the slitted end 46 of the expansion cylinder 42.

Figure 5:
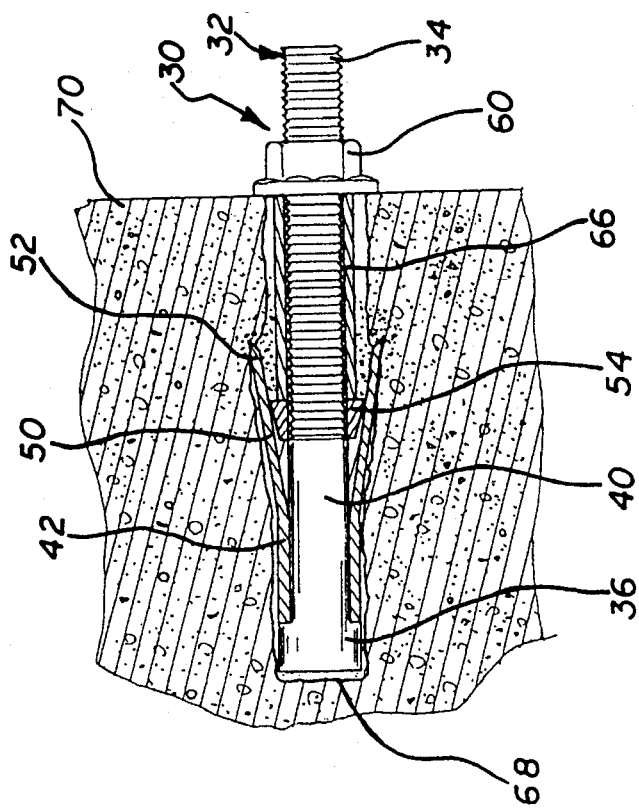
FIG. 5 is a cross-sectional view showing the expansion bolt of the first embodiment of the present invention anchored in a mounting hole formed on a wall.

With further reference to FIG. 5, showing the expansion bolt 30 anchored in a mounting hole 68 formed on a wall or a fixture 70, to secure the expansion bolt 30 inside the mounting hole 68, the expansion bolt 30 is first inserted into the mounting hole 68, which has an inside diameter slightly larger than the overall outside diameter of the expansion bolt 30 so as to allow the expansion bolt 30 to be received therein in a loosely movable manner. The nut member 60 is then tightened on the threaded section 34 of the bolt body 32 to force the support cylinder 66 to move the expanding ring 54 into the slitted end 46 of the expansion cylinder 42 so as to have the slitted end 46 expand and flare and thus having the tips 52 which flares outward tightly contact and frictionally engage the inside diameter of the mounting hole 68.

When a force is applied to the expansion bolt 30 in a direction attempting to move the expansion bolt 30 out of the mounting hole 68, the tips 52 of the slitted end 46 of the expansion bolt 32 that point toward the opening of the mounting hole 68 partially pierce into the inside diameter of the mounting hole 68 to prevent the expansion bolt 30 from being moved out of the mounting hole 68.

To allow the sharpened tips 52 to partially pierce into the inside diameter of the mounting hole 68, the expansion cylinder 42 is preferably made of a material of stiffness.

Figure 6:
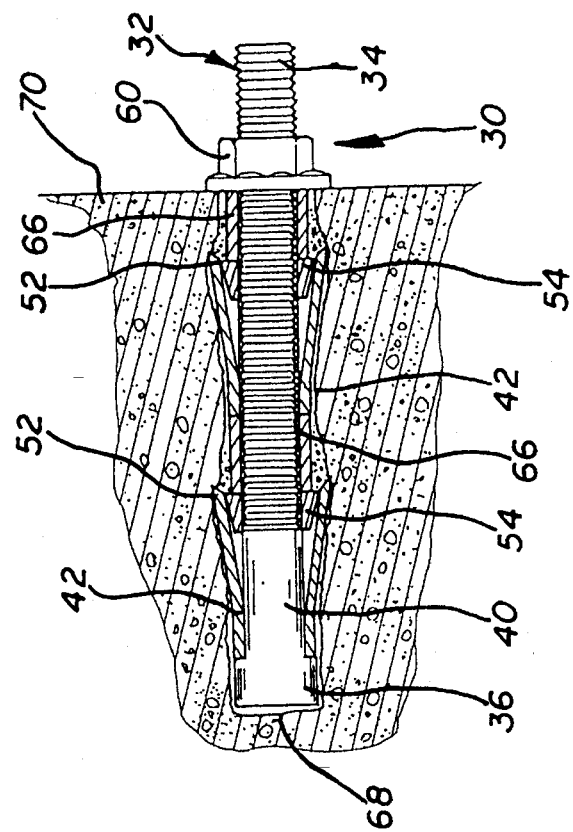
FIG. 6 is a cross-sectional view showing an expansion bolt constructed in accordance with a second embodiment of the present invention anchored in a mounting hole formed on a wall.

It is also possible to use more than one expansion cylinder and expanding ring pair on the bolt body 32 to increase the anchoring capability of the expansion bolt 30 inside the mounting hole 68 and thus providing the expansion bolt 30 with a stronger resistance to withdrawal from the mounting hole 67, as shown in FIG. 6.

In the second embodiment shown in FIG. 6, two expansion cylinders 42 with two expanding rings 54 are mounted on the bolt body 32, with the flat end of the first expansion cylinder 42 supported by the shoulder 38 of the bolt body 32 and the flat end of the second expansion cylinder 42 supported by a further support cylinder 66 which is supported by the expanding ring 54 associated with the first expansion cylinder 42. The expanding ring 54 associated with the second expansion cylinder 42 is abutted by the support cylinder 66 so that when the nut member 60 is tightened on the threaded section 34 of the bolt body 32, the support cylinder 66 which is axially moved by the nut member 60 forces the second expanding ring 54 into the slitted end 46 of the second expansion cylinder 42 which in turn pushes, with its flat end 44 abutting against the further support cylinder 66, the first expanding ring 54 into the slitted end 46 of the first expansion cylinder 42 which is supported on the shoulder 38 of the bolt body 32. By this arrangement, two sets of tips 52 of the expansion cylinders 42 are in tight contact engagement with the inside diameter of the mounting hole 68 to hold the expansion bolt 30 inside the hole 68 and to provide more ratchet members which prevent the expansion bolt 30 from being accidentally withdrawn out of the mounting hole 68.

It is quite apparent that if necessary, there can be more than two sets of expansion cylinder, expanding ring and support cylinder disposed in series axially along the expansion bolt body 32 for providing a stronger anchoring capability of the expansion bolt 30 of the present invention.

It is apparent that although the invention has been described in connection with the preferable embodiments, it is contemplated that those skilled in the art may make changes to the preferred embodiments without departing from the scope of the invention as defined in the appended claims.

What is claimed is:

1. An expansion bolt structure comprising:

an elongated bolt body having a threaded section formed on an end thereof and an expanded portion formed on an opposite end to define a circumferential shoulder;

at least a first expansion cylinder having a length substantially shorter than the elongated body, a substantially constant outer diameter, and an inside diameter slidably fit over the elongated bolt body, the first expansion cylinder having a flat first end stopped and supported by the shoulder and a plurality of slits extending along a portion of the length of the first expansion cylinder to define therebetween a plurality of end tabs each having a tip outward flaringly expandable;

at least a first expanding ring slidably fit over the bolt body, having an inclined circumferential outer surface defining a reduced diameter at a frustum-shaped first end thereof facing and slightly smaller than the inside diameter of the slitted end of the first expansion cylinder so as to be wedgingly insertable into the slitted end of the first expansion cylinder; and a nut member threadingly engaging the threaded section of the bolt body to be moveable along the bolt body so as to force the reduced end of the first expanding ring to wedge into and thus flaringly expand the slitted end of the first expansion cylinder.

2. The expansion bolt as claimed in claim 1, further comprising a support cylinder slidably fit over the bolt body between the nut member and the first expanding ring so as to transmitting movement of the nut member along the bolt body to the first expanding ring to force the first expanding ring to wedge into the slitted end of the first expansion cylinder.

3. The expansion bolt as claimed in claim 1, wherein each of the end tabs comprises a sharpened tip pointing toward the first expanding ring.

4. The expansion bolt as claimed in claim 2, wherein each of the end tabs comprises a sharpened tip pointing toward the first expanding ring.

5. The expansion bolt as claimed in claim 1, further comprising a second expansion cylinder and a second expanding ring slidably fit over the bolt body and disposed in series between the first expanding ring and the nut member, said second expansion cylinder having a length substantially shorter than the elongated body and an inside diameter slidably fit over the elongated bolt body, the length of the bolt body being substantially greater than the sum of the lengths of the first and second expansion cylinders, the second expansion cylinder having a flat first end stopped and supported by the first expanding ring and a plurality of slits extending along a portion of the length of the second expansion cylinder to define therebetween a plurality of end tabs each having an tip outward flaringly expandable and the second expanding ring which is slidably fit over the bolt body having an inclined circumferential outer surface defining a reduced diameter at a first end facing and slightly smaller than the inside diameter of the slitted end of the second expansion cylinder so as to be wedgingly insertable into the slitted end of the second expansion cylinder.

6. The expansion bolt as claimed in claim 2 further comprising a second expansion cylinder and a second expanding ring slidably fit over the bolt body and disposed in series between the support cylinder and the nut member, said second expansion cylinder having a length substantially shorter than the elongated body and an inside diameter slidably fit over the elongated bolt body, the length of the bolt body being substantially greater than the sum of the lengths of the first and second expansion cylinders, the second expansion cylinder having a flat first end stopped and supported by the first expanding ring and a plurality of slits extending along a portion of the length of the second expansion cylinder to define therebetween a plurality of end tabs each having an tip outward flaringly expandable and the second expanding ring which is slidably fit over the bolt body having an inclined circumferential outer surface defining a reduced diameter at a first end facing and slightly smaller than the inside diameter of the slitted end of the second expansion cylinder so as to be wedgingly insertable into the slitted end of the second expansion cylinder, a second support cylinder slidably fit over the bolt body and disposed between the second expanding ring and the nut member.

7. The expansion bolt as claimed in claim 5, wherein each of the end tabs comprises a sharpened tip pointing toward the first expanding ring.

8. The expansion bolt as claimed in claim 6, wherein each of the end tabs comprises a sharpened tip pointing toward the first expanding ring.

9. An expansion bolt assembly for providing anchorage in a hole, comprising:

a bolt having a shoulder disposed at end thereof and threading formed on the other end thereof, said bolt being inserted in a hole with said threaded end thereof projecting out of the hole;

at least one expansion cylinder slidably received on said bolt and having a plurality of tabs formed on one end thereof in a spaced relationship, said tabs projecting toward the opening of the hole, said expansion cylinder being substantially uniform in thickness longitudinally therealong;

at least one frustum-shaped expanding ring, the number of said expanding rings corresponding to the number of said expansion cylinders, said expanding ring being slidably received over said bolt and having the smaller-diameter end thereof positioned between said bolt and the ends of said tabs;

at least one support cylinder, the number of said support cylinders corresponding to the number of said expansion cylinders, said support cylinder slidably received over said bolt and at one end thereof abutring the larger-diameter end of said expanding ring, the length of said support cylinder depending on the number of said expansion cylinders and the corresponding number of said expanding rings such that the other end of said support cylinder projects over a portion of said threading of said bolt; and a collared nut threadedly engaged with said bolt and abutring said support cylinder, said nut being threaded inwardly on said bolt, thereby urging said support cylinder inwardly against said expanding ring, urging the smaller-diameter end of said expanding ring inwardly between said tabs and said bolt, urging said tabs to expand and contact the walls of the hole.

10. An expansion bolt assembly as claimed in claim 9, wherein there are two said expansion cylinders, two said expanding rings, and two said support cylinders;

said expansion cylinders, said expanding rings, and said support cylinders being inserted over said bolt in sets in alternaring sequence.

11. An expansion bolt assembly as claimed in claim 9, wherein the ends of said tabs are arrow shaped.

* * * * *